US009469504B2

(12) United States Patent
Hopp

(10) Patent No.: US 9,469,504 B2
(45) Date of Patent: Oct. 18, 2016

(54) BRAKING METHOD AND CONTROL FOR PASSENGER TRANSPORTATION SYSTEM

(71) Applicant: Inventio AG, Hergiswil (CH)

(72) Inventor: Roman Hopp, Udlingenswil (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 14/897,684

(22) PCT Filed: May 28, 2014

(86) PCT No.: PCT/EP2014/061098
§ 371 (c)(1),
(2) Date: Dec. 11, 2015

(87) PCT Pub. No.: WO2014/198545
PCT Pub. Date: Dec. 18, 2014

(65) Prior Publication Data

US 2016/0152440 A1 Jun. 2, 2016

(30) Foreign Application Priority Data

Jun. 13, 2013 (EP) .................................... 13171795

(51) Int. Cl.
*B66B 5/16* (2006.01)
*B66B 1/32* (2006.01)
(Continued)

(52) U.S. Cl.
CPC . *B66B 5/02* (2013.01); *B66B 1/30* (2013.01); *B66B 1/32* (2013.01); *B66B 5/16* (2013.01); *B66B 25/006* (2013.01); *B66B 29/00* (2013.01)

(58) Field of Classification Search
CPC ....... B66B 29/00; B66B 1/30; B66B 25/006; B66B 1/32; B66B 5/02; B66B 5/16; B66B 5/18
USPC .......................................................... 198/323
See application file for complete search history.

(56) References Cited

U.S. PATENT DOCUMENTS 5,278,484 A * 1/1994 Hakala ...................... H02P 3/24 187/287
6,896,119 B2 5/2005 Wiesinger et al.
(Continued)

FOREIGN PATENT DOCUMENTS

EP 1323661 A1 7/2003
EP 1323662 A1 7/2003
(Continued)

*Primary Examiner* — Mark A Deuble
(74) *Attorney, Agent, or Firm* — Fraser Clemens Martin & Miller LLC; William J. Clemens

(57) ABSTRACT

A braking method for a passenger transportation system, which system is embodied as an elevator, escalator, or moving walk, is initiated upon the occurrence of a technical problem in the passenger transportation system. An activation signal activates a service brake of the passenger transportation system and an emergency stop is initiated. In addition to the activation of the service brake, the activation signal is immediately fed to a brake control of the passenger transportation system, so that, upon the occurrence of the activation signal, the brake control switches a drive machine of the passenger transportation system into a motor-brake operating mode. The drive machine is only switched by the brake control into a braking-torque-free state when a braking effect of the service brake on moving components of the passenger transportation system is detected and transmitted to the brake control.

16 Claims, 2 Drawing Sheets

(51) Int. Cl.

| | |
|---|---|
| ***B66B 29/00*** | (2006.01) |
| ***B66B 5/02*** | (2006.01) |
| ***B66B 1/30*** | (2006.01) |
| ***B66B 25/00*** | (2006.01) |

(56) References Cited

U.S. PATENT DOCUMENTS

| | | | | |
|---|---|---|---|---|
| 8,430,212 | B2 * | 4/2013 | Ueda | B66B 5/0031 187/247 |
| 2011/0011681 | A1 * | 1/2011 | Kondo | B66B 1/32 187/247 |
| 2011/0094837 | A1 * | 4/2011 | Gewinner | H02M 3/33523 188/171 |
| 2011/0162913 | A1 * | 7/2011 | Kattainen | B66B 1/34 187/280 |
| 2011/0278099 | A1 * | 11/2011 | Kattainen | B66B 1/32 187/288 |
| 2015/0075917 | A1 * | 3/2015 | Kattainen | B66B 1/32 187/288 |

FOREIGN PATENT DOCUMENTS

| | | | |
|---|---|---|---|
| EP | 1997765 | A1 | 12/2008 |
| JP | H04286587 | A | 10/1992 |
| WO | 2012049357 | A1 | 4/2012 |

* cited by examiner

BRAKING METHOD AND CONTROL FOR PASSENGER TRANSPORTATION SYSTEM

FIELD

The invention relates to a braking method for a passenger transportation system which is embodied as an elevator, escalator, or moving walk, a brake control for executing this braking method, and a passenger transportation system with this brake control. The invention particularly relates to the field of elevator systems.

BACKGROUND

When a technical problem occurs in a passenger transportation system, the elevator car of an elevator, for example, must be halted as quickly as possible. Such a process, known as an emergency stop, is effected by the immediate triggering of a service brake of the passenger transportation system. Further, in known passenger transportation systems of the prior art, on occurrence of an emergency stop, a drive motor of the drive machine is simultaneously disconnected from the electricity network. For a user of the passenger transportation system, emergency stops are very unpleasant, because, in order to achieve as short a braking distance as possible, the braking power of the service brake, and the resulting braking deceleration, are very high. Mechanically, an emergency stop can only be controlled with difficulty, since the braking deceleration depends to a great extent on the kinetic energy that must be braked, the condition of the service brake, and the temperature of its brake linings. This can cause forces on the user that exceed 1 g.

From EP 1 997 765 A1 a brake control for an elevator car is known. By means of this brake control, the braking force of an electromagnetic brake at the instant of an emergency stop can be so controlled that the braking deceleration of an elevator car matches a predefined value. This is based on a deceleration control value and a velocity signal. However, it is regarded as a disadvantage that the calculations that are required for this purpose take a long time, which delays the generation of the braking force. For this reason, the brake control that is known from EP 1 997 765 A1 has an embodiment in which a portion of the total braking force that is generated at the instant of the emergency braking of the elevator car can be adjusted. Further, a non-adjustable portion of the braking force is foreseen, which generates a braking force immediately, without an adjustment of this portion taking place at the instant of the emergency braking of the elevator car.

The brake control that is known from EP 1 997 765 A1 has the disadvantage that, although a reduction of the braking force during braking of the elevator car is possible, and at the same time a more rapid commencement of the braking effect with the non-adjustable portion of the braking force occurs, system-related delays on switchover nonetheless worsen the braking behavior. Further, the predefined non-adjustable portion of the braking effect is only not too large if it is predefined correspondingly small. Such a low predefinition of the braking effect can have the effect that, in most cases, on initiation of the emergency braking, the braking effect is too little.

A braking method for a passenger transportation system is also disclosed in U.S. Pat. No. 6,896,119 B2. This braking method comprises the method steps that, as well as an activation of the service brake, also the disconnection of the drive machine from the power-supply network is triggered.

According to this braking method, the disconnection of the drive machine from the power supply network, by switching off the frequency converter, only takes place after the service brake has been activated. This braking method has the disadvantage that, although the disconnection of the drive from the power-supply network takes place after the activation of the mechanical service brake, the braking effect of the mechanical service brake remains completely disregarded.

SUMMARY

An objective of the present invention is to propose a braking method for a passenger transportation system, a brake control for executing this braking method, and a passenger transportation system with this brake control, in order to achieve, at an emergency stop, as short a braking distance as possible and, despite the emergency stop, to offer a user of the passenger transportation system a predefined ride comfort.

The objective is fulfilled by a braking method for a passenger transportation system which is embodied as an elevator, escalator, or moving walk. The object is further fulfilled by a brake control which is suitable for executing this braking method, and by a passenger transportation system with such a brake control.

Different from known passenger transportation systems of the prior art, with the braking method according to the invention, during an emergency stop the drive machine of the passenger transportation system is not disconnected from the power-supply network, or switched into a state that is free of braking torque, at the same time as the service brake is activated. Instead of disconnecting the drive machine from the power-supply network at the same time as activating the service brake, in addition to activation of the service brake the activation signal is immediately fed to a brake control of the passenger transportation system. Based on the transmitted activation signal, by means of the brake control the drive machine of the passenger transportation system is switched into a motor-braking mode and the drive machine, through the brake control, is only switched into a braking-torque-free state when a braking effect of the service brake is detected on moving components of the passenger transportation system and is transmitted to the brake control. This means that, during an emergency stop, according to the invention, a changeover from the pure motor-brake operating mode to purely mechanical braking of the service brake takes place.

Through the changeover from the pure motor-brake operating mode to purely mechanical braking of the service brake taking place depending on the detected braking effect of the service brake, the overlapping time period, in which both the drive machine, and the mechanical service brake, brake simultaneously, can be kept as short as possible. This results in an exceptionally gentle transition from the motor-brake operating mode to pure mechanical braking of the service brake. Further, the brake lining of the service brake is maximally conserved, in that the service brake need not brake a drive machine, when, on account of the set braking ramp, the frequency converter specifies a higher rotational speed of the drive machine than the rotational speed of the brake drum of the mechanical service brake would be for a purely mechanical braking. Furthermore, the proposed braking method decisively increases the safety of the system, since the instant of disconnection of the drive machine from the power-supply network is directly dependent on the detected braking effect of the service brake on the moving components, and the disconnection is therefore triggered by the braking effect of the service brake.

Self-evidently, small bearing frictions of the drive machine, and the motor braking torque resulting from a residual magnetization, can also be present after the disconnection of the drive machine from the power supply network, but in connection with the "braking-torque-free state" property, these remain disregarded.

Since the drive machine can act in braking manner also in other operational cases, in connection with the present invention, and in order to differentiate from those other operational cases, a motor-braking operating mode is mentioned which is specifically assigned to the emergency stop. The other operational cases include, for example, braking of the elevator car on reaching a destination story, or limitation of the velocity of the elevator car during downward travel, if the mass of the elevator car is greater than the mass of the counterweight. Based on the motor-brake operating mode defined above, a braking pattern can be achieved that is matched to the respective passenger transportation system during an emergency stop.

The service brake can have spring-loaded brake shoes, which, in the case of a braking, can generate a braking torque which is, at least theoretically, constant. If the service brake is designed in such manner that it is capable of braking the maximum mass difference between the counterweight and the elevator car and holding it stationary, then this constant braking torque is very high.

A further disadvantage of the passenger transportation systems that are known from the prior art is that, on simultaneous disconnection of the motor current and activation of the service brake, during a time period that is short, but nonetheless of practical relevance, the drive motor is de-energized and therefore torque-free, while the service brake does not yet engage. Inter alia, a certain time elapses until the brake shoes or suchlike rest against the brake disk or a brake drum. Further, certain delays can occur as a result of necessary switching operations. The difference in mass which, as a rule, exists between the elevator car and the counterweight can result in an additional acceleration of the elevator car. The service brake must then destroy even more kinetic energy than was present at the instant of triggering the emergency stop. This results in a longer braking distance.

As already stated, a further problem is that the braking powers that are necessary in the concrete situation greatly differ. They depend on the loading of the elevator car and the momentary direction of travel. For example, in a conceivable situation, the mass of the elevator car plus its load can be equal to the mass of the counterweight. In the event of an emergency stop, the fixedly set braking torque of a mechanical service brake is too large for this load situation. In the case of elevators with steel ropes as suspension means, the limited friction between the traction shave and the steel ropes can serve to limit the braking torque. Then, although an emergency stop is unpleasant for the passenger, he is not excessively forced down. However, elevators with belts as suspension means display a very high coefficient of friction between the belt and the traction sheave. In this case, in the event of an emergency stop, the belt displays hardly any slipping on the traction sheave, with the result that the full braking torque of the service brake is transmitted through the suspension means to the elevator car. This results in rapid deceleration, which is highly unpleasant for the user. Furthermore, the elevator car can begin to oscillate in the direction of travel. Such oscillating travel movements are also very unpleasant for the user.

In consequence, in the event of an emergency stop, depending on the direction of travel, a difference in mass between the loaded elevator car and the counterweight can cause additional braking or additional acceleration. Taking into account the maximum possible difference in mass in the case of an unloaded, or hardly loaded, elevator car and a fully loaded elevator car therefore results in a wide range for the ideal braking power in the individual case, or the ideal braking torque, or the ideal braking force, of the service brake. Moreover, with a given difference in mass in a direction of travel, an additional acceleration occurs if, for example, the drive motor of the drive machine is de-energized, or otherwise switched to free-running or suchlike, before the service brake engages.

The present invention eliminates these problems by the deceleration of the elevator car in the case of an emergency stop taking place directly through the driving machine in the motor-brake mode. An adjustment of the braking power or of the braking torque or of the braking force can thus take place without modification of the service brake. Further, the ride comfort can be optimized according to the situation. However, for example for special cases, in particular in the event of a malfunction in the area of the drive machine, the full braking effect of the service brake is nonetheless available. Particularly advantageous is that, at least for the required switching time of the service brake, the drive machine serves as motor brake. Thereby not only an additional acceleration of the elevator car on switching over, or at the beginning of the emergency stop, is prevented but the elevator car is already braked from the occurrence of the activation signal, so that the velocity of the car is already substantially reduced upon engagement of the service brake. Hence, inter alia, consideration can also be given to delay times of switching elements, such as overcurrent protectors or relays, which are used to control the service brake and to disconnect the drive machine from an electric power supply. It is important that the drive motor of the drive machine is only disconnected from the power-supply network after closing of the service brake has been registered. The time delay is hereby technically predefined and is based inter alia on the switching behavior of the switching elements. In the event of an emergency stop, the activation signal that corresponds to the status of the safety circuit can be used for the purpose of initiating a braking of the drive motor of the drive machine already before closure of the service brake. This braking can be effected by the brake control, in particular by means of a frequency converter.

In order, during an emergency stop, to achieve a braking distance that is as short as possible, and a ride comfort that is as high as possible, the motor-brake operating mode can take place power-controlled and rotational-speed-controlled. For this purpose, the brake control regulates the braking power of the drive machine up to a maximum permissible braking-power limit, this braking-power limit only being fallen below when a rotational deceleration of the drive machine exceeds a maximum permissible rotational deceleration. The braking-power limit that is stored in the control as a fixed value, and hence the maximum permissible braking-torque limit, limits the maximum loading of the mechanical components, so that the drive machine does not act on the moving components of the passenger transportation system that are to be braked, with a braking torque that is too high. At the same time, a regulation of the maximum permissible braking-power limit results in an optimal utilization of the mechanical strength of the components that are to be braked, and hence in a braking distance that is as short as possible. Since, however, the kinetic energy of the moving components varies depending on the loading of the elevator car and, further, diminishes in proportion to the square of the rotational deceleration, to further increase the ride comfort, the rotational deceleration, or negative acceleration, is also considered. The maximum permissible rotational deceleration is a value that is defined in the control and that limits the negative acceleration, or deceleration, in such manner that the user who is present in the elevator car is, for example, loaded uniformly and with less than 1 g. By this means, the very unpleasant oscillating travel movements can also be avoided in elevators with belt drives.

To determine the momentary braking power of the drive machine, a braking torque of the drive machine can be continuously, or sequentially, measured and transmitted to the brake control. The braking torque can, for example, be measured directly by means of a torque-measuring sensor. This has the advantage that it takes place more directly, certainly, and precisely than a calculation of the braking torque from the electrically generated power of the drive machine.

In a further embodiment of the invention, upon occurrence of the activation signal, the activation of the service brake can be delayed by a delay-time period. By this means, the closing of the service brake in the event of an emergency stop is undertaken in targeted manner at a later point in time than is the case according to the required switching time with the immediately triggered service brake. Consequently, by means of the drive machine acting as a motor brake, the kinetic energy of the elevator car can be reduced over a longer time period than with a direct activation of the service brake. Besides an improved braking, particularly an increased comfort for a user, also a greater part of the kinetic energy of the elevator car can thereby be recuperated, should recuperation capability be extant. Further, the service brake is thereby conserved, since it must convert less kinetic energy of the moving system into heat.

The end of the deceleration time period, and hence the activation of the service brake, can take place, for example, on expiry of a predefined deceleration time period or on attainment of a predefined rotational speed of the drive shaft of the drive machine. Preferably, the predefined rotational speed of the drive shaft is less than 2 revolutions per second and greater than 0.1 revolutions per second, so that the service brake engages at an extremely low speed of the moving components of the passenger transportation system. Particularly preferably, the predefined rotational speed is set at less than 1 revolution per second and more than 0.5 revolutions per second. The small residual rotational speed at the lower limit of the range of the rotational-speed range defined above is sufficient to unequivocally detect a braking effect of the service brake, so that, after detection has occurred, the drive machine can be switched into a braking-torque-free state and the service brake can brake the moving components to standstill.

Here, however, is to be noted that the delay of the signals for activation of the service brake that are generated by the safety circuit is problematic for safety reasons and may also infringe relevant regulations. From the safety standards, for example from the standard EN 81, it is known that, in the event of an emergency stop, a delay in the engagement of the service brake is not permitted. In the event of failure of the drive machine, this would cause the brake to be closed too late, or not at all. To attain the prescribed safety nonetheless, as it is attained with immediate activation of the service brake, an additional safety check by a safety device, or a safety system with the safety device, is provided. On occurrence of the activation signal, by means of the safety device, the functional capability of the drive machine and/or at least a device of the passenger transportation system that is relevant for the functional capability of the drive machine, is monitored. If only one of these conditions is not fulfilled, the safety system closes the service brake with the safety device and, if necessary, disconnects the drive motor from the network. Also further actions, such as, for example, the additional activation of a second service brake, or a safety brake or safety gear, are possible. The prescribed safety standard is thereby fulfilled, or even exceeded, by the safety device. For the purpose of monitoring, the safety system can use, for example, four extant, measurable operating parameters, namely the actual motor current, the actual motor speed or motor rotational-speed frequency value, the rotational deceleration of the drive shaft, and the safety-circuit signal.

The braking methods described above necessitate a corresponding brake control of a passenger transportation system. On the occurrence of a technical problem in the passenger transportation system, by means of an activation signal, a service brake of the passenger transportation system is activated and an emergency stop is initiated. At least during a required switching time of the service brake, the brake control controls a drive machine of the passenger transportation system in a motor-brake operating mode. Further, as soon as a braking effect of the service brake is detected, the brake control switches the drive machine into a braking-torque-free state. The service brake and the drive machine of the passenger transportation system are not components of the brake control. However, the brake control can be integrated wholly or partly into the service brake and/or the drive machine of the passenger transportation system. Preferably, however, the brake system is embodied as a separate subassembly or module which, during installation, is connected with the service brake and the drive machine. By this means, the brake control can also be manufactured and operated independent of a service brake and a drive machine of the passenger transportation system.

The braking effect of the service brake can, for example, be detected by a measurement and analysis of the change in at least one operating parameter of the drive machine. These operating parameters can be a torque of the drive machine, and/or the electrical energy, or current and voltage, that is generated by the drive machine, and/or the rotational deceleration that is detected on the drive shaft.

As already stated further above, in a further embodiment of the invention, upon occurrence of the activation signal, the brake control can delay triggering of the service brake by a delay-time period. The delay-time period can be predefined in fixed manner. Furthermore, the end of the delay-time period, as well as the attainment of a predefined rotational speed of the drive machine, can be predefined.

In order to attain the prescribed safety nonetheless, as it is achieved, for example, in the event of an immediate triggering of the service brake, an additional safety control by a safety device is provided. By means of the safety device, the functional capability of the drive machine, and/or at least a device of the passenger transportation system that is relevant for the functional capability of the drive machine, is monitored. In particular, by means of the safety device, it can be ascertained whether the frequency converter is active, whether the frequency converter is capable of decelerating an elevator car or suchlike, and whether the power-supply switch and the power-supply network are in order. Additionally, or alternatively, it is advantageous for the safety device to monitor a motor current of the drive machine and/or a momentary rotational speed of the drive machine and/or a momentary reference value for the rotational speed of the motor of the drive machine and/or a rotational deceleration of the drive shaft.

The monitoring takes place continuously or sequentially at least upon the occurrence of the activation signal that is generated by a safety circuit of the passenger transportation system. Self-evidently, the monitoring can also take place continuously or sequentially during the normal operation of the passenger transportation system, so that, upon the occurrence of the activation signal, the functional capability of the aforesaid individual components is already known. If only one of these conditions is not fulfilled, the safety device closes the service brake with the safety device and, if necessary, disconnects the drive motor from the power supply network. The prescribed safety standard is thus fulfilled. For the purpose of monitoring, the safety system can, for example, use three extant, measurable operating parameters, namely the actual motor current, the actual motor speed, or the frequency value of the rotational speed of the motor, and the safety-circuit signal.

By means of a recuperation-capable frequency converter or inverter, an electric power supply for the drive machine can be provided in advantageous manner, the brake control, by means of the recuperation-capable frequency converter, switching the drive machine, and the frequency converter recuperating into a power-supply network at least part of electrical energy that was generated in the motor-brake operating mode of the drive machine. A recuperation of braking energy is thus enabled.

In the motor-brake operating mode, the frequency converter can regulate the drive motor with a combination of torque control and relational-speed control until the service brake is actually closed. Immediately after engagement of the service brake, in addition to the motor-brake torque, its mechanical braking causes a change in the rotational deceleration of the drive motor and thereby a considerable change in the generated electrical power of the drive motor. The closure of the service brake can thereby, at least indirectly, be detected by the brake control through signals from the frequency converter about the actual rotational speed and the actual torque and/or the electrical energy, or current and voltage, generated by the drive machine being received by the brake control. In response to these signals, the drive motor of the drive machine can be switched torque-free via the frequency converter.

An improved brake control for a passenger transportation system can thus be realized. In order, in the event of an emergency stop, to achieve a braking distance that is as short as possible and a ride comfort that is as high as possible, the braking deceleration can be initiated by means of the frequency converter. The problem of the additional acceleration is thereby avoided and part of the kinetic energy is removed from the passenger transportation system, or elevator system, before the service brake mechanically initiates a deceleration. The deceleration with the drive motor of the drive machine and the frequency converter takes place preferably power-controlled and rotational-speed-controlled. Then, the brake control can, for the purpose of achieving the shortest possible braking distance, regulate the frequency converter at the upper permissible braking-power limit, this power limit being fallen below when the deceleration or rotational deceleration of the drive motor exceeds a specified deceleration rate. The mechanical engagement of the service brake can be recognized through the substantial change in the electric power that is generated by the drive motor, which manifests itself as a drop in power, and the substantially higher rate of deceleration, by means of which a disconnection of the drive motor, or a torque-free switching of the drive motor, can be triggered.

To control the magnitude of the braking power, a controllable service brake, whose braking power is variable, is hence not necessarily required. The service brake can hence also be embodied in simplified manner. In particular, brake magnets or suchlike can thereby be saved, which reduce the braking force of the service brake, should the braking power in the concrete situation be too high, since such magnitude controls can take place through the drive machine acting as motor brake. Furthermore, a robust embodiment of the passenger transportation system results. Since, different from an embodiment in which the maximum braking power is limited by a slipping of steel ropes on a traction sheave, the passenger transportation system with the proposed brake control is also independent of possible deviations of the coefficients of friction between the steel ropes and the traction sheave, which can occur, for example, as a result of soiling, or diminishing lubrication, of the contact surface. By this means the operational safety can also be improved. Further, the improved ride comfort can also be achieved with other suspension means, in particular with a belt. The passenger transportation system can, in particular, be embodied as an elevator. The brake control then serves to halt an elevator car of the elevator. In corresponding manner, however, a halting of the respective passenger transportation system by the brake control can also take place in the case of an escalator or a moving walk. The explanations that have been given in relation to the elevator and the elevator car therefore also apply in corresponding manner for an escalator or a moving walk.

DESCRIPTION OF THE DRAWINGS

Preferred exemplary embodiments of the invention are explained in greater detail in the description that follows below by reference to the attached drawings.

DETAILED DESCRIPTION

Figure 1:
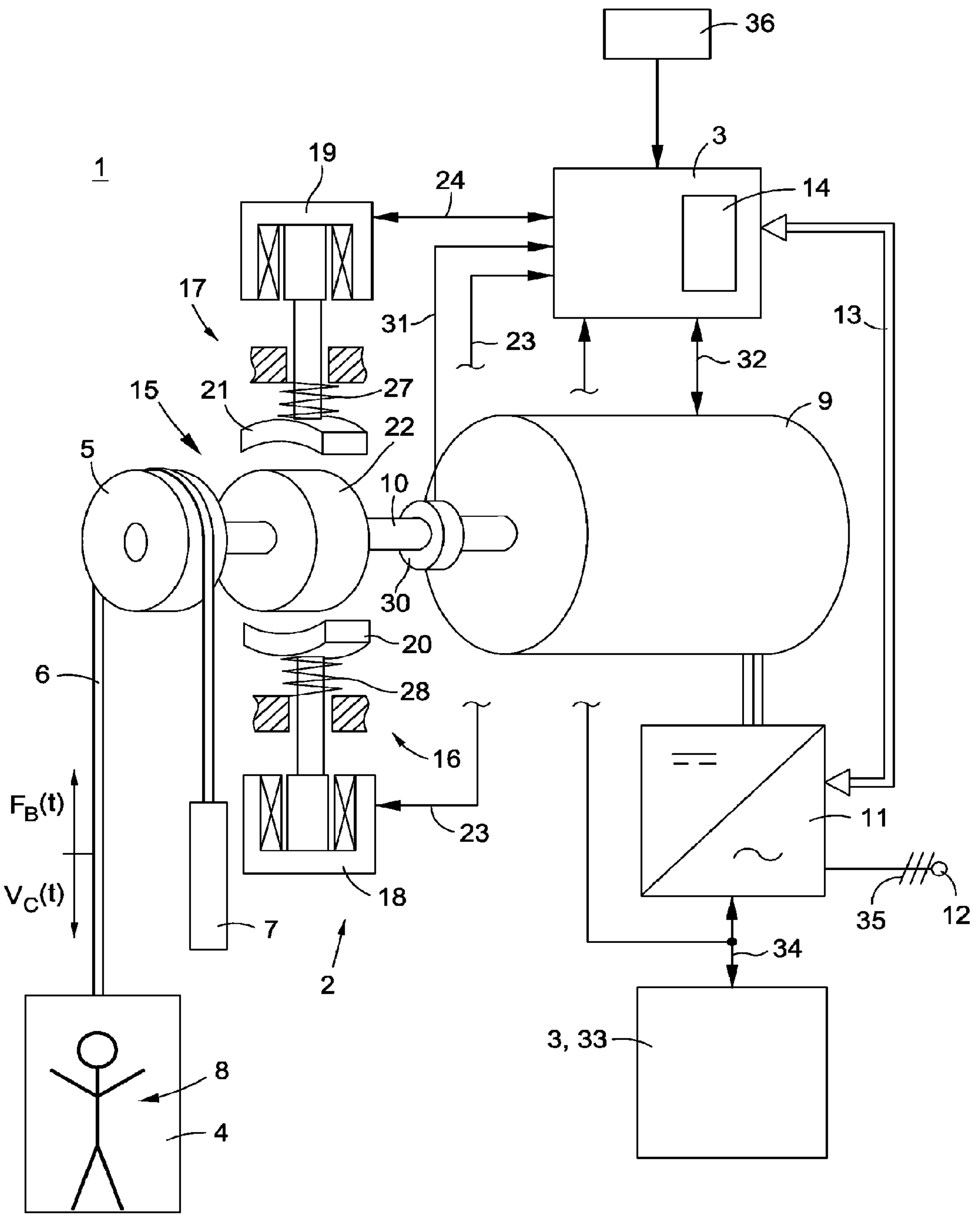
FIG. 1 shows a passenger transportation system, with a driving and braking system, and a brake control, in a partial, diagrammatic representation corresponding to an exemplary embodiment of the invention.

FIG. 1 shows a passenger transportation system 1, which is embodied as an elevator or elevator system 1, with a driving and braking system 2, and a brake control 3, in a partial schematic diagrammatic representation according to an exemplary embodiment. In a correspondingly modified embodiment, the passenger transportation system 1 can also be embodied as an escalator or moving walk. The driving and braking system 2, as well as the brake-control system 3, serve passenger transportation systems 1 which are embodied as elevator, escalator, or moving walk.

The passenger transportation system 1 of the exemplary embodiment has an elevator car 4 and a traction sheave 5. Further provided is at least one suspension means 6, which at one end is connected with the elevator car 4 and at the other end with a counterweight 7. The suspension means 6 is passed over the traction sheave 5. The elevator car 4, the suspension means 6, the counterweight 7, and the traction sheave 5 belong to the moving parts of the elevator system, as is represented in relation to the suspension means 6 with a velocity $V_C(t)$ and a braking force $F_B(t)$. Through the braking force $F_B(t)$, the velocity $V_C(t)$ of the elevator car 4 can be reduced. The braking deceleration which hereupon occurs, in other words the acceleration in the direction opposite to the velocity $V_C(t)$, acts, for example, on a user 8 who is present in the car 4.

For simplification, further components, which serve, for example, to guide the elevator car 4 along its path, are omitted from the illustration.

The passenger transportation system 1 has a drive machine 9 with a drive motor. Depending on the embodiment of the passenger transportation system 1, in addition to the drive motor, the drive machine 9 can also have a gear or suchlike. The drive machine 9 has a drive shaft 10, arranged on which is the traction sheave 5. By means of the drive machine 9, the traction sheave 5, and, via the traction sheave 5, also the suspension means 6, the counterweight 7, and the elevator car 4, can be driven. In the present exemplary embodiment, the traction sheave 5 turns in counterclockwise direction, as a result of which the elevator car 4 moves along its path with a velocity $V_C(t)$ downwards, and the counterweight 7 upwards.

Further, a frequency converter 11 is provided, which is connected with a power-supply network, or current network, 12. The frequency converter 11 provides a power supply to the drive machine 9. Thereby, via a signal conductor 13, which can also be realized by means of a bus system or similar, the frequency converter 11 is connected with the brake control 3 of the driving and braking system 2. The brake control 3 thus makes use of the frequency converter 11 to switch the drive machine 9 into a motor-brake operating mode. In the motor-brake operating mode, the drive machine 9, or the drive motor 9, acts as the motor brake. Hence, the brake control 3 can use the drive machine 9, which is already extant, to drive the passenger transportation system 1, and the frequency converter 11, for braking, without increasing the number of components that are required.

In addition, the passenger transportation system 1 has a service brake 15, with brake units 16, 17. The brake units 16, 17 each have an actor 18, 19. The actors 18, 19 are embodied, for example, as electromagnetic actors 18, 19. For safety reasons, the actors 18, 19, and the service brake 15, are energized for as long as the latter must remain open. Through actuation of the actors 18, 19, or through interruption of the power-supply voltage, by means of spring elements 27, 28 the brake linings 20, 21 of the brake units 16, 17 are applied to a brake disk 22. The brake disk 22 is connected to the drive shaft 10 in rotationally fixed manner. Hence, through activation of the service brake 15, a braking torque is exerted on the drive shaft 10, which causes a deceleration of the elevator car 4.

When the brake control 3 switches the service brake 15, the effect of the service brake 15 only begins after a required switching time of the service brake 15. This required switching time results, for example, from delay times of switching elements, such as overcurrent protectors or relays, and an actuation time for application of the brake linings 20, 21 from their starting position to the brake disk 22. In this exemplary embodiment, each of the brake units 16, 17 is connected with the brake control 3 via an assigned control conductor 23, 24.

The driving and braking system 2 also has a rotational-speed sensor 30, which is connected with the brake control 3 via a signal conductor 31. In this exemplary embodiment, the rotational-speed sensor 30 is arranged on the drive shaft 10 of the drive machine 9. Via the rotational-speed sensor 30, the brake control 3 registers the momentary rotational speed of the drive machine 9. Further, the brake control 3 is connected with the drive machine 9 via a signal conductor 32. By this means, the brake control 3 can register a braking torque of the drive machine 9. Hence, operating parameters of the drive machine 9 are at least indirectly registerable. Hence, the brake control 3 can take account of such operating parameters in its controlling function.

In addition, the brake control 3 contains a safety device 33. The said safety device 33 can be a part of a safety system, or be integrated into a safety system of the passenger transportation system 1. Via a signal conductor 34, the safety system 33 is connected with the frequency converter 11 as well as with the brake control 3.

When a braking, in particular an emergency stop, is triggered, the brake control 3 switches the drive machine 9 into a motor-brake operating mode. In the motor-brake operating mode, the drive machine 9 acts as motor brake. The commencement of effectiveness of the service brake 15 is only possible, at the earliest, after the required switching time of the operating brake 15. For this time period, namely the required switching time of the service brake 15, the drive machine 9 can therefore already serve to brake the elevator car 4. The brake control 3 can further have a storage unit 14 in which motor-control data of the drive machine 9 are stored. By means of this motor-control data, depending on the load case, or the momentary velocity and loading of the elevator car 4, at the instant of triggering the emergency stop, a motor-brake development curve that is adapted for the current braking case can be calculated. Based on this calculated motor-brake development curve, the drive machine 9 brakes the moving components until engagement of the service brake 15 is detected. The moving components are essentially the elevator car 4, the traction sheave 5, the suspension means 6, the counterweight 7, the drive shaft 10, and the brake disk 22. In order to keep the computing power of the brake control 3 low, self-evidently also motor-brake development curves that have been determined by trials can be saved in the storage unit 14, which, depending on the load case, or also depending on the incident that triggers the emergency stop, can be selected and used by the brake control 3.

An emergency stop is triggered, for example, when a safety circuit 36 acts on the brake control 3 by means of an activation signal. In FIG. 1, the safety circuit 36 is represented schematically as a unit. The safety circuit 36 can, for example, have an array of switches or sensors that are connected in series, which monitor the various safety-relevant points of the passenger transportation system 1. As soon as only one of these not-shown switches of the safety circuit 36 is opened, the safety circuit 36 is interrupted and this interruption is transmitted to the brake control 3 as an activation signal. By means of this switch of the safety circuit 36, for example, an opening of a door of the elevator car 4, an opening of at least one door that is provided on the floors for the passenger transportation system 1, and further suchlike, can be monitored.

In a first embodiment of the invention, the brake control 3 triggers the service brake 15 immediately. Thus, after its required switching time, the service brake 15 engages and mechanically brakes the moving components. The required switching time of the service brake 15 can be stored in the brake control 3. Preferably, however, the commencement of effectiveness of the service brake 15 is determined by the operating parameters of the drive machine 9 that are registered. In particular, through the registration of the rotational speed of the drive machine 9, and the registration of the torque of the drive machine 9, the commencement of effectiveness of the service brake 15 can be detected and determined. After the commencement of effectiveness of the service brake 15, the drive machine 9 is switched in such manner that it no longer acts as a motor brake. This avoids the braking force that is provided by the service brake 15 being additionally increased by the braking force of the drive machine 9. The braking force $F_B(t)$ that acts on the elevator car 4 is hence initially given essentially solely through the drive machine 9 acting as motor brake, and then, at least essentially, through the braking effect of the service brake 15.

In order to terminate the motor-brake operating mode of the drive machine 9, the drive machine 9 can, for example, be switched to free-running and/or de-energized.

In a further embodiment of the invention, the brake control 3 can, however, also delay the commencement of effectiveness of the service brake 15, which is possible, at the earliest, after the required switching time of the service brake 15, by an additional delay-time period. By the amount of this delay-time period, the operation of the drive machine 9 in the motor-brake operating mode is also maintained and thereby prolonged. The braking force $F_B(t)$ that acts on the elevator car 4 for the purpose of braking can thereby be influenced for a longer period of time, and hence regulated in magnitude. By this means, different than with a commencement of effectiveness of the service brake 15, the velocity $V_C(t)$ of the elevator car 4 can be so influenced in a desired manner that a uniform braking of the elevator car 4 is made possible. In particular, the derivative by time of the velocity $V_C(t)$ of the elevator car 4 can be held at least approximately constant, which results in a constant deceleration of the elevator car 4. Thus, for a specified braking distance, the ride comfort for the user 8 during braking can be optimized. By this means, also velocity taperings at the beginning and end of the braking operation are possible in order to achieve a more gentle increase, and a more gentle decrease, in the forces acting on the user 8. In the event of an emergency braking, this allows the user 8 at the beginning of the emergency braking to build up, and at the end of the emergency braking to release again, a bodily bracing, so that he is not forced down.

Preferably, in the motor-brake mode of the drive machine 9, the elevator car 4 is braked to a very low velocity, the service brake 15 only becoming effective when, for example, the drive shaft 10 displays a rotational speed that is less than 1 revolution per second and greater than 0.5 revolutions per second. Upon engagement of the service brake 15, on account of the very low rotational speed and the high braking force of the service brake 15, a slight, but in the elevator car 4 readily perceptible, jerk may be caused, which imparts to the user the secure feeling that the elevator car 4 has finally come to a standstill. Thereupon, the service brake 15 continues to assure the safety of the passenger transportation system 1. The rotational speed of the drive shaft 10 can be registered by the rotational-speed sensor 30.

For the purpose of assuring the safety of the passenger transportation system 1, at least during the deceleration time period, the safety device 33 monitors the functional capability of the drive machine 9 and the device 11 that is relevant for the functional capability of the drive machine 9, namely the frequency converter 11. The safety device 33 can also monitor further devices that are relevant for the functional capability of the drive machine 9. In particular, it can monitor whether the frequency converter 11 for the drive machine 9 is active and whether the frequency converter 11 is momentarily capable of operating the drive machine 9 in the motor-brake operating mode. Further, a functional capability of a network switch 35 for the drive machine 9, via which the power-supply network 12 is connected with the frequency converter 11, can be monitored. By this means, the power-supply network 12 can also be monitored, to determine whether the power supply for the drive machine 9 is functionally capable.

In addition, the safety device 33 can monitor a motor current of the drive machine 9, the momentary rotational speed (motor rotational speed) of the drive machine 9, a momentary reference value for the rotational speed of the motor of the drive machine 9, a rotational deceleration of the drive shaft, and/or other operating parameters of the drive machine 9.

The frequency converter 11 is preferably embodied as a recuperation-capable frequency converter 11. Then, in the motor-brake mode, through the drive machine 9 acting as a generator, electrical energy can be generated from the kinetic energy of the elevator car 4. This electrical energy can then be recuperated through the frequency converter 11 into the power-supply network 12.

Figure 2A:
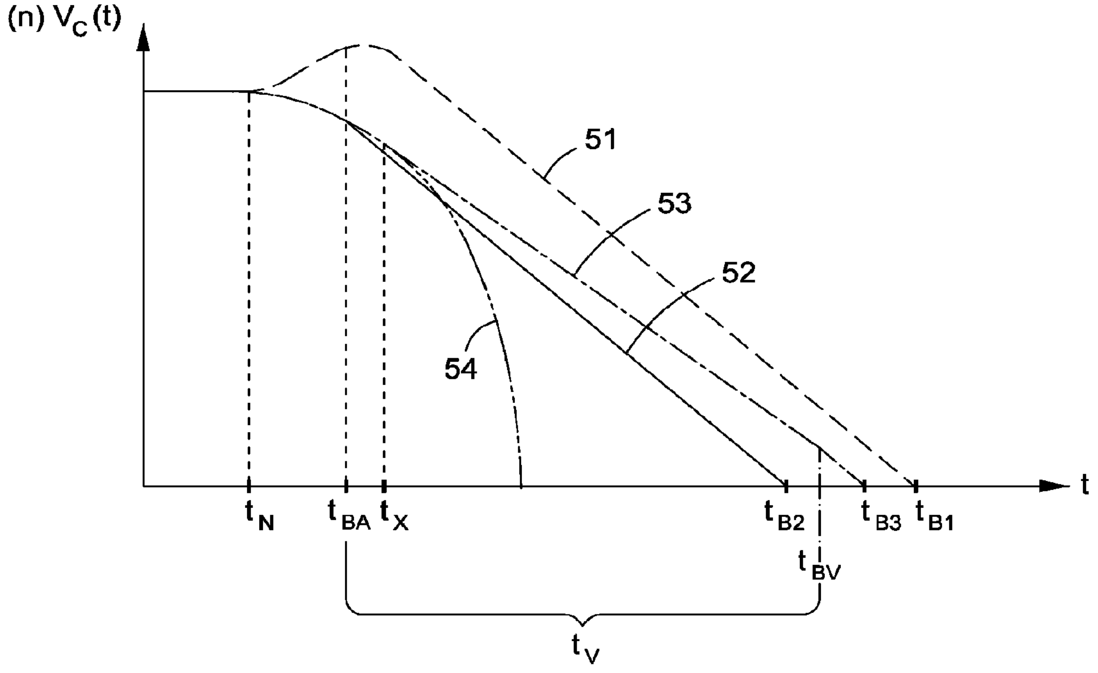
FIG. 2A is an exemplary velocity/time diagram of an emergency stop that is controlled by the brake control of the passenger transportation system that is represented in FIG. 1.
Figure 2B:
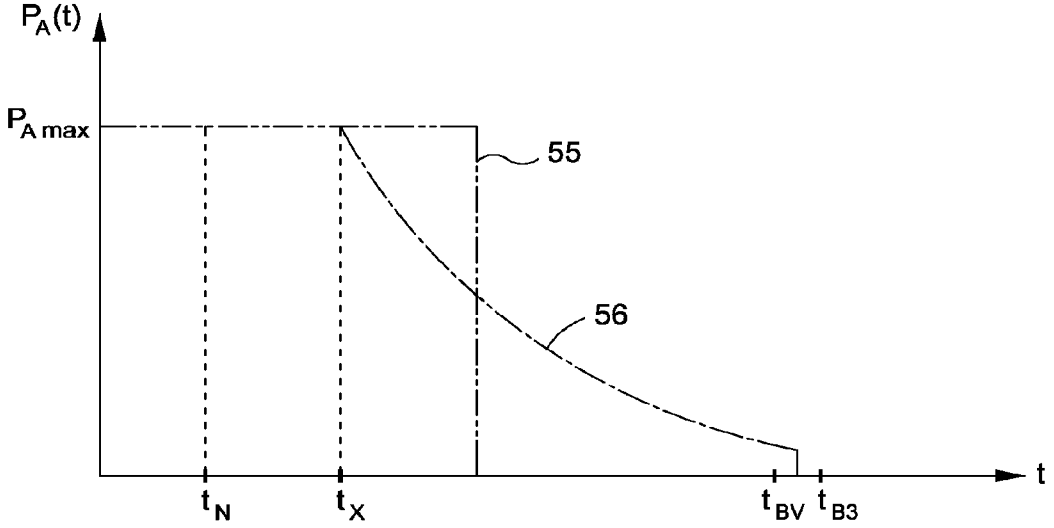
FIG. 2B is a braking-power/time diagram of the emergency stop that is represented in FIG. 2A.

In FIG. 2A an example of an emergency stop is schematically represented in the form of a velocity/time diagram, and in FIG. 2B, in the form of a braking-power/time diagram, such as can occur through a brake control 3 that is shown in FIG. 1. The description of FIGS. 2A and 2B takes place jointly, and making use of the reference numbers of FIG. 1 where components of the passenger transportation system 1 are mentioned.

The diagram that is depicted in FIG. 2A shows, schematically represented by a dashed line, a first velocity development curve 51 of an emergency stop without deployment of the brake control 3 according to the invention, as it occurs, for example, in a conventional passenger transportation system. With the triggering of the emergency stop at instant $t_N$, the service brake 15 is activated and the drive machine 9 is simultaneously disconnected from the current, or power-supply, network 12. In the case of a fully loaded, downward-traveling elevator car 4, the velocity $V_C(t)$ continues to increase until the switching instant tea of the service brake 15. After the switching instant tea, the service brake 15 brakes the moving components 4, 5, 6, 7, 10, 22 of the passenger transportation system 1 purely mechanically until the first standstill instant $t_{B1}$.

FIG. 2A also shows diagrammatically, represented with a continuous line, a second velocity development curve 52 of an emergency stop with deployment of the brake control 3 according to the invention. With the triggering of the emergency stop at instant $t_N$, not only is the service brake 15 activated but, through the brake control, also the drive machine 9 is switched directly into a motor-brake operating mode. As is clearly visible in FIG. 2A, until engagement of the service brake 15 at response time tea, the moving components 4, 5, 6, 7, 10, 22 are already braked by the drive machine 9. After switching instant tea, the service brake 15 brakes the moving components of the passenger transportation system 1 purely mechanically until the second standstill instant tee, since immediately after the switching instant tea of the service brake 15, the drive machine 9 is switched torque-free.

Further schematically represented in FIG. 2A with a chain-dotted line is a third velocity development curve 53 of an emergency stop with deployment of the brake control 3 according to the invention, wherein, by means of the brake control 3, the activation of the service brake 15 is delayed by a delay-time period $t_V$. The service brake 15 therefore only begins to brake from the switching instant $t_{SV}$. Through the delayed deployment of the service brake 15, the moving components 4, 5, 6, 7, 10, 22 can be braked longer by means of the drive machine 9 until almost at the third standstill instant $t_{B3}$. By this means, the ride comfort also during an emergency stop is significantly increased, since the transition from motor-brake mode to purely braking by means of the service brake 15 at a low drive-shaft rotational speed takes place considerably more gently than closure of the service brake at a high drive-shaft rotational speed of the drive machine 9. Further, through the delayed activation of the service brake 15, its brake disk 22 and its brake linings 20, 21 can be conserved. Although the third standstill instant $t_{B3}$ can occur somewhat later than for an undelayed deployment of the service brake 15, the third standstill instant $t_{B3}$ can take place at an earlier instant than in an emergency stop without the deployment of a brake control 3 according to the invention. The braking distances that are achievable with the brake control 3 are correspondingly shorter and increase the safety of the passenger transportation system 1 overall.

Branching from the third velocity development curve 53 within the delay-time period $t_V$ is a fourth velocity development curve 54, represented by a double-chain-dotted line, which has theoretical character and is explained in association with the braking-power/time diagram that is depicted in FIG. 2B. In order, during an emergency stop, to achieve a braking distance that is as short as possible, and a ride comfort that is as high as possible, the motor-brake operating mode can take place power-controlled and rotational-speed-controlled. For this purpose, the brake control 3 regulates the braking power $P_A$ of the drive machine 9 to a maximum permissible braking-power limit $P_{A\ max}$. The braking power limit $P_{A\ max}$ is a predefined value, which is stored in the brake control 3 or its storage unit 14, and limits the braking power of the drive machine 9, so that the latter does not act on the moving components 4, 5, 6, 7, 10, 22 that are to be braked, with a braking torque that is too high. Regulation of the maximum permissible braking power limit $P_{A\ max}$ results not only in an optimal utilization of the mechanical strength of the components 4, 5, 6, 7, 10, 22, that are to be braked, but also in a braking distance that is as short as possible. If the drive machine 9 in the motor-brake operating mode were to be regulated as far as the standstill of the passenger transportation system 1 entirely at the braking power limit $P_{A\ max}$, the reduction in velocity of the elevator car 4 would correspond to the fourth velocity development curve 54. In FIG. 2B, the motor-brake operating mode that is entirely regulated at the braking power limit $P_{A\ max}$ is depicted by means of a double-chain-dotted first braking-performance curve 55.

Since, however, the kinetic energy of the moving components 4, 5, 6, 7, 10, 22 varies depending on the loading of the elevator car 4, and, further, reduces in proportion to the reduction in the rotational speed, to further increase the ride comfort, also the reduction in velocity, or reduction in rotational speed, of the drive shaft 10 is considered. At constant maximum braking power $P_A=P_{A\ max}$, the rotational deceleration of the drive shaft 10, and hence the deceleration of the elevator car 4, would increase in inverse proportion to the diminishing rotational speed of the drive shaft 10, whereby, after a certain braking period, a maximum permissible rotational deceleration of the drive shaft 10, and hence a maximum permissible deceleration of the elevator car 4, would be exceeded. In order to avoid such an exceeding of the permissible rotational deceleration, as soon as a maximum permissible deceleration is attained in a braking operation, the braking power $P_A$ is so regulated that its value reduces in proportion to the reducing rotational speed of the drive shaft 10, and the rotational deceleration is held constant until almost standstill. Hence, the braking power limit $P_{A\ max}$ is fallen below when a reduction in velocity of the elevator car 4, or a rotational deceleration of the drive shaft 10 of the drive machine 9, exceeds a maximum permissible rotational deceleration.

In FIGS. 2A and 2B, this exceeding occurs at instant $t_X$, represented by the chain-dotted brake-performance curve 56. The maximum permissible rotational deceleration limits the negative acceleration, or deceleration, so that the user 8 who is present in the elevator car 4 is burdened with less than 1 g. By this means, the unpleasant oscillating travel movements can also be avoided in elevators with belt drives. As shown in FIG. 2B, the drive machine 9 is only switched torque-free after the service brake 15 brakes mechanically from the delayed switching instant $t_{BV}$, in order that the moving components 4, 5, 6, 7, 10, 22 attain standstill. Clearly to be seen in FIG. 2A is that the sections of the curve of the velocity development curves 51, 52, and 53 all display the same gradient as soon as the moving components 4, 5, 6, 7, 10, 22 become only purely mechanically braked by means of the service brake and the drive machine 9 is switched torque-free.

The invention is not restricted to the exemplary embodiments that are described.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A braking method for a passenger transportation system, which system is embodied as an elevator, escalator, or moving walk, wherein, upon the occurrence of a technical problem in the passenger transportation system, a service brake of the passenger transportation system is activated and an emergency stop is initiated, the method comprising the steps of:

activating the service brake by a brake control of the passenger transportation system in response to an activation signal generated by a safety circuit of the passenger transportation system to the brake control;

switching a drive machine of the passenger transportation system into a motor-brake operating mode by the brake control in response to the activation signal; and switching the drive machine by the brake control into a braking-torque-free state when a braking effect of the service brake on moving components of the passenger transportation system has been detected and transmitted to the brake control.

2. The braking method according to claim 1 wherein the motor-brake operating mode is power-controlled and rotational-speed-controlled, wherein the brake control regulates a braking power of the drive machine to a maximum permissible braking-power limit and the braking-power during braking is only below the maximum permissible braking-power limit if a rotational deceleration of the drive machine exceeds a maximum permissible rotational deceleration.

3. The braking method according to claim 2 wherein for determining a momentary braking power of the drive machine, a braking torque of the drive machine is continuously or sequentially measured and transmitted to the brake control.

4. The braking method according to claim 1 wherein upon occurrence of the activation signal, the activation of the service brake is delayed by a predetermined delay-time period.

5. The braking method according to claim 4 wherein an end of the delay-time period, and hence the activation of the service brake, takes place upon attainment of a predefined rotational speed of a drive shaft of the drive machine.

6. The braking method according to claim 5 wherein the predefined rotational speed of the drive shaft is less than 2 revolutions per second and greater than 0.1 revolutions per second.

7. The braking method according to claim 5 wherein the predefined rotational speed of the drive shaft is less than 1 revolution per second and greater than 0.5 revolutions per second.

8. The braking method according to claim 1 wherein at least following an occurrence of the activation signal, a safety device monitors a functional capability of at least one of the drive machine and a device of the passenger transportation system that is relevant for a functional capability of the drive machine.

9. A brake control for a passenger transportation system having a drive machine and a service brake for braking the drive machine, whereby, upon occurrence of a technical problem in the passenger transportation system an activation signal is generated and an emergency stop of the passenger transportation system is initiated, comprising:

the brake control being connected to the drive machine and to the service brake, the brake control being configured to receive the activation signal;

the brake control being responsive to the activation signal for activating the service brake; and the brake control, at least during a required switching time of the service brake after activation, switching the drive machine into a motor-brake operating mode and, as soon as a braking effect of the service brake on the drive machine is detected, switching the drive machine into a braking-torque-free state.

10. The brake control according to claim 9 wherein the brake control registers the braking effect of the service brake by a measurement and analysis of at least one operating parameter of the drive machine, wherein the at least one operating parameter is one of a torque, electrical energy, current and voltage generated by the drive machine.

11. The brake control according to claim 9 wherein the brake control, upon the occurrence of the activation signal, delays triggering of the service brake by a predetermined delay-time period.

12. The brake control according to claim 11 wherein the delay-time period is fixed or is predefined at an end of the delay-time period by attainment of a predefined rotational speed of a drive shaft of the drive machine.

13. The brake control according to claim 9 including a safety device connected to the brake control for, at least after occurrence of the activation signal, monitoring a functional capability of at least one of the drive machine and a device of the passenger transportation system that is relevant for the functional capability of the drive machine.

14. The brake control according to claim 13 wherein the safety device immediately ends a deceleration time period and triggers the service brake when the safety device registers a malfunction of the drive machine or a malfunction of the device that is relevant for the functional capability of the drive machine.

15. A passenger transportation system, embodied as an elevator, escalator, or moving walk, and including the brake control according to claim 9.

16. The passenger transportation system according to claim 15 including a recuperation-capable frequency converter providing a power supply for the drive machine, and by which the brake control switches the drive machine, wherein the frequency converter recuperates at least part of electrical energy that is generated by the drive machine in the motor-brake operating mode.

* * * * *